United States Patent

[11] 3,581,719

| [72] | Inventor | Leonard P. Gau<br>Birmingham, Mich. |
|---|---|---|
| [21] | Appl. No. | 872,596 |
| [22] | Filed | Oct. 30, 1969 |
| [45] | Patented | June 1, 1971 |
| [73] | Assignee | Chrysler Corporation<br>Highland Park, Mich. |

[54] FLUIDIC EXHAUST RECIRCULATOR FOR TWO STROKE CYCLE ENGINES
10 Claims, 4 Drawing Figs.

[52] U.S. Cl. ............................................. 123/73,
123/103, 123/119, 261/Fluidic
[51] Int. Cl. ................................................... F02b 33/04,
F02m 25/06
[50] Field of Search .......................................... 123/119 A,
73, 74, 103; 261/Fluidic

[56] References Cited
UNITED STATES PATENTS

| 1,804,321 | 5/1931 | Crowe | 123/65(I) |
| 2,134,920 | 11/1938 | Kapenacy | 123/65(I) |
| 2,369,245 | 2/1945 | Nesfield | 123/65(I) |
| 3,367,311 | 2/1968 | Tenney | 123/65(I) |
| 3,385,052 | 5/1968 | Holtermann et al. | 123/65(I) |
| 3,386,710 | 6/1968 | York, Jr. | 123/119 |
| 3,388,898 | 6/1968 | Wyczalek | 123/119X |
| 3,389,894 | 6/1968 | Binder | 123/119X |

*Primary Examiner*—Wendell E. Burns
*Attorney*—Harness, Talburtt and Baldwin

ABSTRACT: A fluidic element connected to the exhaust of a two cycle engine for recirculating fuel-rich exhaust portions to the combustion chamber.

INVENTOR.
Leonard P. Gau
BY
Harness, Talburtt & Baldwin
ATTORNEYS.

FLUIDIC EXHAUST RECIRCULATOR FOR TWO STROKE CYCLE ENGINES

BACKGROUND

The two cycle engine, especially one and two cylinder versions, enjoys increasingly wide use today in boats, motorcycles, lawnmowers, snowblowers, models of all kinds such as airplanes, mobile power plants and in various power tools such as chain saws. Its availability for such a wide variety of applications stems primarily from the fact that it has some power to weight advantage over four stroke cycle engines. Through the years its power size has grown to exceed some small vehicular power plants. That growth however has been inhibited somewhat by its relatively higher specific fuel consumption.

In its present form the two cycle engine fails to meet the requirements of most vehicular applications, partly because of its fuel consumption, but also because it runs poorly at light loads or part throttle. The rough operation or aperiodic firing of the cylinder or cylinders is caused primarily by exhaust dilution when the incoming fuel charge has insufficient momentum to clean out or scavenge the combustion chamber between firings.

Another disadvantage inherent to the two cycle engine in its present form lies in the fact that a portion of the incoming fuel charge tends to be exhausted along with the exhaust gases before its combustion thus resulting in undesirable emissions consisting in large part of unburned hydrocarbons.

SUMMARY OF THE INVENTION

This invention provides a fluidic solution to the foregoing deficiencies of the two cycle engine by fluidically diverting the fuel enriched portion of the exhaust gases that blow out the exhaust port particularly at high speed operation and recirculating them to the combustion chamber. Fuel economy and the minimization of engine emissions are than particular objects and advantages of this invention.

BRIEF DESCRIPTION OF THE DRAWING

The same numbers are used in various figures to indicate equivalent elements.

DESCRIPTION OF THE PREFERRED EMBODIMENTS

Figure 1:
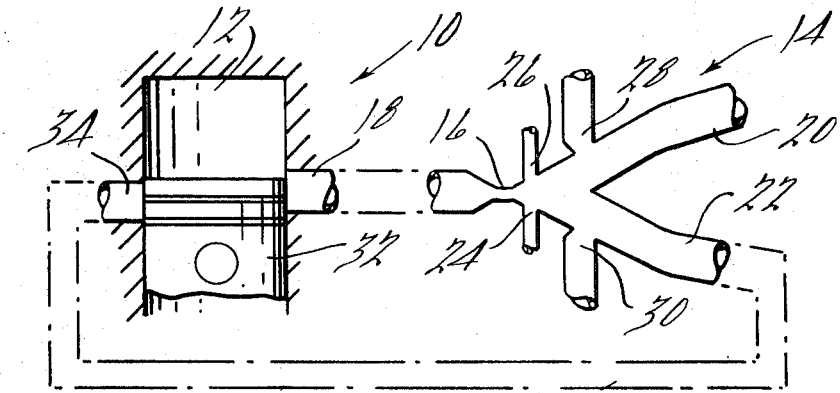
FIG. 1 is a schematic drawing of one form of the invention utilizing a bistable fluidic switch.

As previously indicated, the two cycle engine presently suffers the disadvantages of relatively high fuel consumption and emission. These disadvantages are caused primarily because the fuel enriched intake air is used to push exhaust gases out of the cylinder combustion chamber and some of the charge invariably escapes in varying amounts out the exhaust port, especially during the beginning of the compression stroke before closure of the exhaust port. FIG. 1 shows in schematic fashion a two cycle engine 10 in which the major portion of the fuel enriched exhaust gases, normally lost to the atmosphere, are recirculated back into the engine combustion chamber 12. Recirculation is made possible by the use of a fluid logic switching means, such as the bistable element 14, connected to receive the engine exhaust and a recirculation means or recycle path, indicated by dotted lines, connected to element 14. Element 14 includes an input conduit means 16 connected to the engine exhaust port 18, a first output conduit 20 leading to the atmosphere, a second output conduit 22 connected to the recycle path means and first and second oppositely disposed control port means, 24 and 26 respectively, connected intermediate input conduit means 16 and both of the output conduit means 20 and 22 so as to be upstream thereof. Element 14 may also include a pair of vent port conduit means 28 and 30.

The apparatus operates as follows. Near the end of the power stroke, as piston 32 uncovers the exhaust outlet means or port 18, a slight pressure signal at control port 24 or a slight vacuum and/or flow restriction at control port 26 will assure that the cylinder's exhaust gas is vented to the atmosphere through a normal exhaust path via conduit 20. Vent ports 28 and 30 are open to the atmosphere and function in this embodiment only as escape vents in case of blockage somewhere in the system, but they are not necessary to the operation of the invention and may be omitted. At some time during the intake period, preferably just prior to the beginning of the compression stroke, a slight pressure signal at control port 26 or a slight vacuum and/or restriction at control port 24 will divert the fuel enriched portion of the exhaust gases back to combustion chamber 12 via the normal fuel inlet means intake port 34, by causing a change in the "wall attachment" flow of the exhaust gases and diverting them into conduit 22. Thus, that portion of the fuel enriched exhaust gases normally lost to the atmosphere is recovered because it is recirculated to the combustion chamber by means of a recycle path.

Figure 2:
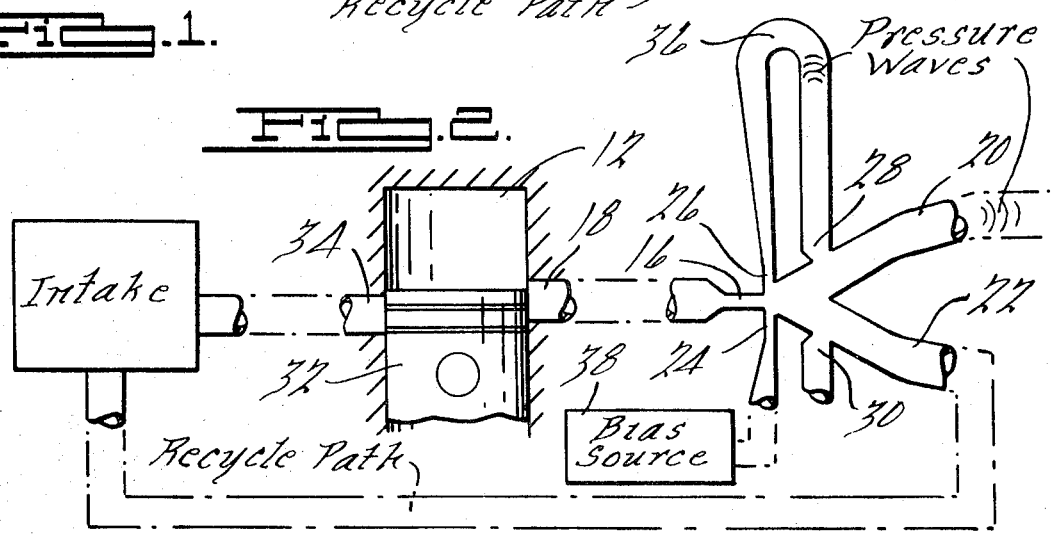
FIG. 2 is a schematic drawing of another form of the invention utilizing a bistable fluidic switch wherein a feedback arrangement is connected to one of the control ports to effect switching and recirculation of fuel-rich portions of the exhaust gases.

In the modified embodiment of FIG. 2, the bistable logic device 14 is operated by means of a U-shaped connection 36 between vent port means 28 and control port means 26. This embodiment operates as follows. As piston 32 uncovers exhaust port 18, exhaust gases flow through the input conduit 16 of logic device 14 and to the atmosphere via conduit 20. Flow is set along this path due to the positive pressure applied by control port 24 connected to a bias source means 38 which may be any of the types of bias sources well known in the fluid art. As a result of the initiation of exhaust flow along this path, a pressure wave is induced to flow out conduit 20 as shown. As this exhaust pressure wave passes by vent port 28, another pressure wave is induced into U-shaped conduit 36 as shown. The induced pressure wave, propagating at the speed of sound, is timed, by adjusting the path length of conduit 36, to arrive at control port 26 near the end of the exhaust period, which is the discharge moment for the exhaust gases which are fuel enriched by having been intermixed with the fuel charge introduced in combustion chamber 12. While the overriding pressure effect of the pressure wave is present at control port 26, exhaust flow is diverted into the conduit 22 thereby recycling that fuel-rich portion of the exhaust gas to the combustion chamber along the recycle path and the engine intake means.

Figure 3:
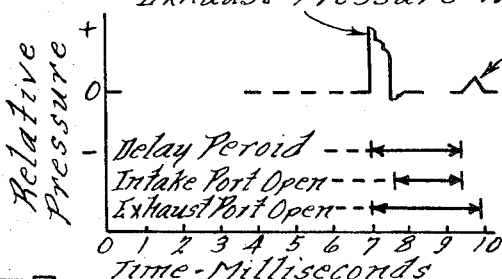
FIG. 3 is a pressure-time graph illustrating the operation of the invention.

For fuel economy enhancement, the distance from exhaust port 18 to input conduit means 16 of bistable element 14 should be as short as possible to minimize entrapment in that region. In addition, the recirculating or recycle path length and volume will be found to have optimum dimensions depending on the particular engine involved for optimal enhancement, using Kistler apparatus the U-tube pressure wave delay timing was examined with an eye to proving the sequence of events. FIG. 3 shows an example of typical pressure wave-time relationships for a two cycle single cylinder engine operating at 6000 r.p.m., i.e., 10 milliseconds per revolution. The exhaust pressure wave was measured downstream in the exhaust pipe and the control pressure signal was measured within a U-tube similar to conduit 36 of FIG. 2. There was no evidence of a pressure wave associated with the recirculated sample. Gas analysis of the content of the recycle path showed an appropriate increase in $CO_2$ as one tuned into the exhaust period. In addition, engine speed could be reduced slightly by tuning lightly into the exhaust period, thus, apparently diluting the intake. Tuning further into the exhaust period simply stopped the engine.

Since exhaust flow occurs only a small fraction of the total engine operating time, it is impractical to pump diversion or switching bias continuously as in the embodiments of FIG. 1 and FIG. 2. It might be more desirable to have the exhaust pressure wave to set the bistable flow in the desired direction and simply reset it with a delayed signal built into the switching element itself. Another approach to positive timing for synchronizing diversion and recirculation of the fuel-rich portion of the exhaust with the proper cycle of the engine would be a mechanical arrangement. For example, a crankshaft driven wheel could be arranged to control the shape or geometry of a control port to provide periodic restriction thereof.

Figure 4:
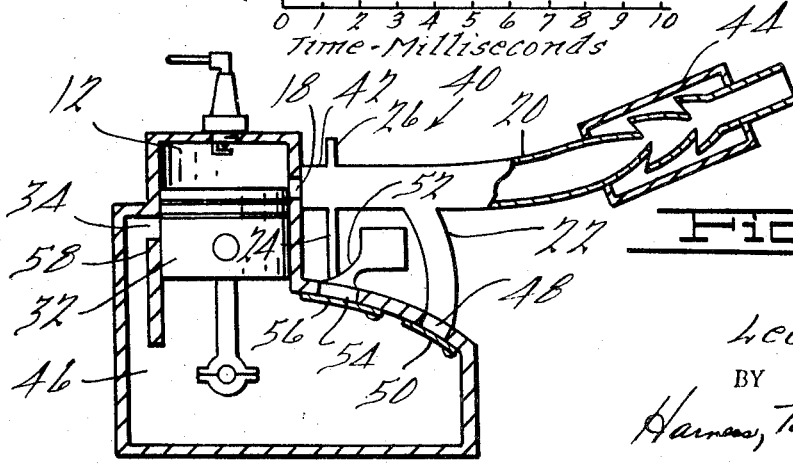
FIG. 4 is a schematic drawing of a form of the invention wherein the inherent flow conditions existing in the engine are used to provide recirculation of fuel-rich portions of the exhaust at times which automatically vary to suit engine speed.

A preferred arrangement of this invention for synchronizing recirculation of fuel-rich exhaust portions with engine cycle is shown in FIG. 4 which includes a monostable fluidic element generally indicated at 40 having a normal exhaust path to the atmosphere along conduits 42 and 20 and fluidic diode 44 which may be any types well known in the art. In this connection, reference is made to the paper entitled "Fluid Mechanics of the Momentum Flueric Diode" presented by Frank W. Paul at the I.F.A.C. Synposium in London, Nov. 4—8, 1968. Fluidic diodes of various types are also manufactured by Aviation Electric Ltd. of Montreal, Canada. The function of the fluidic diode in the exhaust line is to provide for greater flow in one direction (out) than in the other (in) in conduit 20 thereby preventing aspiration of exhaust gases and air into conduit 20 when the exhaust is deflected into conduit 22. The same effect may be obtained by providing a suitably mounted reed valve in conduit 20 if desired.

The fluidic element also includes an exhaust diversion path consisting of conduit 22 which leads into an engine crankcase 46 via an opening 48 which is opened and closed by a normally closed reed valve 50. Opening 48 and reed valve 50 function as a recirculating exhaust inlet means for the crankcase. Control port 26 which is open to atmosphere, and control port 24 are included intermediate conduit 42 and conduits 20 and 22. Control port 24 extends from conduit 13 to fuel inlet means 52 through which a fuel air mixture from a carburetor or the like (not shown) may enter crankcase 46 via an opening 54 therein which is opened and closed by a second reed valve 56. Fuel mixture in the crankcase may enter combustion chamber 12 via a fuel transfer passage 58 or a manifold and an inlet port 34.

This embodiment operates as follows. Near the end of the power stroke, piston 32 opens or uncovers the exhaust port 18 to allow the flow of exhaust gases through conduits 42 and 20 and through diode 44 to the atmosphere. The descent of piston 32 causes an increase in pressure in crankcase 46 which assures the positive closure of reed valves 50 and 56. The wall attached flow of the exhaust gases through conduit 20 is normal for this monostable geometry. At this point in the cycle, inlet port 34 is closed.

As piston 32 continues its descent, inlet port 34 also opens and a fuel charge flows from crankcase 46 through transfer passage 58 and into combustion chamber 12 where partial mixing of the exhaust gases and the fuel charge occurs as the exhaust is being expelled, resulting in fuel enriched exhaust near the end of the exhaust flow during each cycle of the engine.

Having reached the bottom of its stroke at this point, piston 32 begins rising in the cylinder closing inlet port 34 and causing a decrease in crankcase pressure which opens reed valves 50 and 56 causing fuel mixture to enter the crankcase via fuel inlet means 52, opening 54 and opens reed valve 56, and also causing a pressure drop to occur in control port 24. As a result, the pressure differential between control port 26 at atmospheric and control port 24 causes wall attached flow to initiate through conduit 22 and the resultant diversion of the fuel-rich tail end portion of the exhaust gases into crankcase 46 where they mix with the fuel charge for subsequent introduction into combustion chamber 12, and so the cycle repeats itself. As is readily seen, the recirculation of the fuel-rich portion of the exhaust is naturally synchronized with the operation of the engine so that recirculation will occur at proper intervals over all operating conditions and engine speeds.

Having described the invention it should be understood that the structure shown may be modified without departing from the invention which is defined by the following claims.

What I claim is:

1. In an internal combustion engine, a combustion chamber; fuel inlet means and exhaust outlet means associated with said combustion chamber; fluid logic switch means connected to said exhaust outlet means, said switch means comprising an input conduit arranged to receive exhaust gases from said outlet means, first and second output conduits connected to said input conduit, said first output conduit communicating with the atmosphere, and first and second oppositely disposed control ports connected to said input conduit upstream with respect to said outputs for selectively directing exhaust gas into said said output conduits and recirculating means connected to said second output conduit for recirculating exhaust gases passing therethrough to said combustion chamber.

2. The combination of claim 1 including means for regulating fluid pressure at said control ports whereby exhaust gases may be selectively directed between said first and second output conduits.

3. The combination of claim 1 including means associated with said regulating means and synchronized with engine operation whereby said fluidic switch means may divert normal exhaust gases and recirculate fuel-rich portions thereof.

4. The combination of claim 1 wherein said fluidic switch is a bistable element.

5. The combination of claim 4 wherein said fluidic switch includes at least one vent port positioned between said control ports and said output conduits, delay path means connected between said vent port and one of said control ports and a bias source means connected to the other of said control ports.

6. The combination of claim 1 wherein said fluidic switch is a monostable element.

7. The combination of claim 1 wherein said engine includes fuel mixture inlet means and a recirculating exhaust inlet means communicating with the engine crankcase, means for cyclically opening and closing both of said inlet means during engine operation, one of said control ports is connected to said fuel mixture inlet means, said second output conduit is connected to said exhaust inlet means and said crankcase is adapted to transfer fuel contained therein to said combustion chamber.

8. The combination of claim 7 wherein said other control port is open to the atmosphere.

9. The combination of claim 7 wherein said means for opening and closing said inlet means comprises a pair of normally closed reed valves.

10. The combination of claim 7 including a diode muffler connected to said first output conduit.